(12) United States Patent
Pollitt et al.

(10) Patent No.: US 10,830,380 B2
(45) Date of Patent: Nov. 10, 2020

(54) COMPOSITE FLUID TRANSFER CONDUIT

(71) Applicant: Crompton Technology Group Limited, Solihull, West Midlands (GB)

(72) Inventors: William Pollitt, Kenilworth (GB); Ian Thomas Chase, Charfield (GB); Alexander Douglas Taylor, Bloxham (GB)

(73) Assignee: CROMPTON TECHNOLOGY GROUP LIMITED, Solihull (GB)

( * ) Notice: Subject to any disclaimer, the term of this patent is extended or adjusted under 35 U.S.C. 154(b) by 195 days.

(21) Appl. No.: 16/034,463

(22) Filed: Jul. 13, 2018

(65) Prior Publication Data

US 2019/0017633 A1 Jan. 17, 2019

(30) Foreign Application Priority Data

Jul. 14, 2017 (EP) .................................... 17275110

(51) Int. Cl.

| | | |
|---|---|---|
| *F16L 27/12* | (2006.01) | |
| *F16L 25/02* | (2006.01) | |
| *F16L 9/12* | (2006.01) | |
| *B32B 1/08* | (2006.01) | |
| *B32B 5/10* | (2006.01) | |
| *B32B 5/12* | (2006.01) | |
| *B64D 37/00* | (2006.01) | |
| *F16L 25/01* | (2006.01) | |

(52) U.S. Cl.
CPC ............ *F16L 9/125* (2013.01); *F16L 25/025* (2013.01); *F16L 27/125* (2013.01); *B32B 1/08* (2013.01); *B32B 5/10* (2013.01); *B32B 5/12* (2013.01); *B32B 2307/202* (2013.01); *B64D 37/005* (2013.01); *F16L 25/01* (2013.01)

(58) Field of Classification Search
CPC . F16L 9/125; F16L 25/02; F16L 25/01; F16L 25/025; F16L 27/125; F16L 27/12
USPC .......................................... 285/223, 231, 95
See application file for complete search history.

(56) References Cited

U.S. PATENT DOCUMENTS

| | | | |
|---|---|---|---|
| 3,901,281 A | 8/1975 | Morrisey | |
| 4,066,281 A * | 1/1978 | De Bonis | F01M 11/02 |
| | | | 285/302 |
| 5,613,524 A | 3/1997 | Martucci | |
| 6,889,716 B2 | 5/2005 | Lundberg et al. | |
| 7,497,235 B2 | 3/2009 | Sato | |

(Continued)

FOREIGN PATENT DOCUMENTS

WO 2012088055 A1 6/2012

OTHER PUBLICATIONS

Extended European Search Report for International Application No. 17275110.9 dated Jan. 16, 2018, 8 pages.

*Primary Examiner* — Aaron M Dunwoody
(74) *Attorney, Agent, or Firm* — Cantor Colburn LLP

(57) ABSTRACT

A fluid transfer conduit comprising: an electrically conductive tube of fibre reinforced polymer composite material which has an electrically conductive outer surface and an electrically conductive inner surface; and on at least one axial end of said conduit, a non-electrically-conductive band formed on either the outer surface or the inner surface of the electrically conductive tube. Forming a non-electrically conductive band on the end of the conduit electrically isolates the electrically conductive outer surface of the conduit from the electrically conductive metal socket into which it is to be inserted.

20 Claims, 4 Drawing Sheets

(56) References Cited

U.S. PATENT DOCUMENTS

| | | | |
|---|---|---|---|
| 8,248,748 B2 | 8/2012 | Ciolczyk et al. | |
| 8,400,749 B2 * | 3/2013 | West | H01R 4/64 361/216 |
| 8,679,606 B2 | 3/2014 | Parfrey | |
| 8,920,704 B2 | 12/2014 | Ciolczyk et al. | |
| 9,243,727 B2 | 1/2016 | Conley et al. | |
| 2008/0078880 A1 * | 4/2008 | Petit | F16L 21/03 244/135 R |
| 2009/0256352 A1 * | 10/2009 | Petit | F16L 39/005 285/123.15 |
| 2010/0003840 A1 * | 1/2010 | Breay | F16L 25/025 439/88 |
| 2010/0044972 A1 * | 2/2010 | Vila | F16J 15/3212 277/612 |
| 2010/0045031 A1 * | 2/2010 | Peachey | F16L 25/01 285/148.7 |
| 2010/0122749 A1 * | 5/2010 | Bouleti | A62C 3/08 138/177 |
| 2010/0226061 A1 * | 9/2010 | Sutton | H01R 4/64 361/216 |
| 2010/0226063 A1 * | 9/2010 | West | H01R 4/643 361/216 |
| 2012/0057267 A1 * | 3/2012 | Petit | F16L 25/01 361/215 |
| 2012/0181384 A1 * | 7/2012 | Courpet | B64D 45/02 244/1 A |
| 2012/0286505 A1 * | 11/2012 | Barre | F16L 25/01 285/47 |
| 2013/0027835 A1 * | 1/2013 | West | F16L 25/01 361/216 |
| 2013/0153046 A1 | 6/2013 | Hansom et al. | |
| 2013/0277960 A1 * | 10/2013 | Neal | F16L 19/028 285/93 |
| 2014/0060881 A1 * | 3/2014 | Rautenberg | H02B 13/045 174/69 |
| 2015/0144221 A1 * | 5/2015 | Doole | F16L 9/125 138/155 |
| 2015/0176732 A1 | 6/2015 | Courpet et al. | |
| 2015/0345682 A1 * | 12/2015 | Fraysse | F16L 27/12 285/418 |
| 2016/0153597 A1 * | 6/2016 | Correa | F16L 27/12 285/119 |
| 2017/0002963 A1 * | 1/2017 | MacConnell | F16L 25/01 |

* cited by examiner

COMPOSITE FLUID TRANSFER CONDUIT

This application claims priority to European Patent Application No. 17275110.9 filed Jul. 14, 2017, the entire contents of which is incorporated herein by reference.

TECHNICAL FIELD

This disclosure relates to fluid transfer conduits such as fuel pipes or air conditioning pipes formed from composite materials. This disclosure particularly relates to such conduits for use in aircraft.

BACKGROUND

Recently fluid transfer conduits, especially those used for aircraft have been made from composite materials instead of from metal. There are various reasons for this, including the need to reduce weight as well as the need to reduce the conductivity of the conduit relative to other aircraft structures (so as to reduce lightning conductivity along the pipe) while retaining some conductivity for alleviating static build up due to fluid flow through the conduit (particularly in the case of fuel lines).

Such conduits need to be connected together or connected to other fluid transfer apparatus in a sealing manner so as to ensure containment of the fluid being transferred. A typical sealing connection is made by inserting the end of the conduit into a receiving socket with a seal such as one or more O-rings extending radially between an outer surface of the conduit and an inner surface of the socket and being compressed therebetween.

At present, the composite conduits have metal (typically Aluminium for low weight) end fittings fitted to each end of the composite tube and the O-rings (or other sealing structures) are provided between this metal end fitting and the receiving socket which is typically also made from metal (again, normally Aluminium). An O-ring is normally seated in a seal seat in the form of a circumferential groove in the metal end fitting. As the O-ring (or other seal structure) is not conductive, a conductive connection is formed between the conductive outer surface of the conduit and the receiving socket by means of an earth bonding wire connected between a bonding tab on the conduit and a bonding tab on the socket (or on a separate structure electrically connected to the socket).

Metal end fittings are both heavy and relatively expensive to produce. Accordingly some recent fluid transfer conduits have been produced entirely from lighter weight composite material, with the seal seat grooves machined into the end portion of the composite fluid transfer conduit.

SUMMARY

According to this disclosure, there is provided a fluid transfer conduit comprising: an electrically conductive tube of fibre reinforced polymer composite material which has an electrically conductive outer surface and an electrically conductive inner surface; and on at least one axial end of said conduit, a non-electrically-conductive band formed on either the outer surface or the inner surface of the electrically conductive tube.

Forming a non-electrically conductive band on the end of the conduit electrically isolates the electrically conductive outer surface of the conduit from the electrically conductive metal socket into which it is to be inserted. The inventors have recognised that there is a potential risk with electrically conductive composite conduits being fitted into metal sockets, namely that galvanic corrosion may take place in the presence of an electrolyte. Galvanic corrosion occurs when two conductors of different materials (and thus different reactivities) come into close proximity with each other in the presence of an electrolyte. This may for example happen in aircraft when an aircraft passes through a cloud causing many surfaces e.g. within the aircraft wings (where fuel pipes are located) to become damp. The water may form an electrolyte that may cause galvanic corrosion. Similar problems may arise for example when flying near sea areas or when de-icing systems are used.

While the O-ring (or other sealing member) that seals the conduit from the socket is not conductive, the surfaces of the conduit and the socket are sufficiently close that a small amount of water on the seal member can bridge the gap and form an electrical connection. The presence of the dissimilar conductors, namely the metal socket next to the conductive composite (typically made conductive by adding a conductive additive such as carbon black to the resin) together with the electrical connection may result in galvanic corrosion which in turn can damage the surfaces of those components. Such damage could result in weakening of the components and a reduction in service life. It should be noted that intimate contact between the conduit and the socket is not required for galvanic corrosion to occur; the dynamic action of the O-ring may be enough to wear the composite material of the conduit causing small particles of composite to contact the socket leading to galvanic corrosion.

Although the circumstances which could result in such corrosion may not be especially frequent, they represent a risk that can be avoided. By forming the non-conductive band on a surface of the electrically conductive tube, this non-conductive band can be used as the sealing contact part of the conduit, preventing the electrical connection between the electrically conductive conduit and the electrically conductive metal socket and thereby preventing galvanic corrosion from arising, even in the presence of the dissimilar materials. Thus, the safety and the service life of the components is increased.

It should be noted that galvanic corrosion was not a problem in earlier arrangements where metal end fittings were provided on the ends of composite fluid transfer conduits as the two metals were generally both Aluminium and thus no galvanic corrosion could occur. The fluid transfer conduit of the present disclosure has no metal end fitting and thus is improved in weight while still avoiding any risk of galvanic corrosion.

It may also be noted that the fluid transfer conduit of the present disclosure still has an electrically conductive outer surface along the majority of its axial length and thus still serves to dissipate any static built up through movement of fluid within the conduit. Additionally, by controlling the conductivity (e.g. controlling the amount of conductive material in the composite), the conductivity of the fluid transfer conduit can be reduced such that it is not a primary lightning conductor. This latter property is particularly advantageous for fuel pipes in aircraft.

It should also be noted that while the most common arrangement is for the fluid transfer conduit to be inserted into a wider metal socket such that the seal is formed between the outer surface of the conduit and the inner surface of the socket (i.e. the non-electrically-conductive band is formed on the outer surface of the conduit), the arrangement can also be the other way around with the fluid transfer conduit being inserted over and around a metal connector part such that the seal is formed between the inner surface of the conduit and the outer surface of the metal connector part (i.e. the non-electrically-conductive band is formed in the inner surface of the conduit).

The non-electrically conductive band may be used as a seal land against which a sealing member rests (and possible slides) to form a seal. In such cases, the band is preferably wide enough to accommodate the possible region of movement of the sealing member plus a small margin of error. However, it is otherwise desirable to minimise the amount of non-conductive surface of the conduit so as to minimise the non-conductive area on which static may be built up as any significant build up of charge can risk creating sparks.

However, instead of using the non-conductive band as a seal land, in some preferred examples the non-electrically-conductive band has a seal seat formed therein, preferably in the form of a circumferential groove. The seal seat may be arranged to receive an O-ring or other sealing member (typically an annular sealing member) so as to hold the sealing member axially in place. A corresponding seal land is provided on the opposite surface (on the socket) and any movement of the conduit can be accommodated by sliding of the sealing member along that seal land.

The non-electrically-conductive band is thus preferably large enough in height (i.e. has enough radial extent) to allow a seal seat to be formed therein while still keeping the whole of the seat separate from the underlying conductive layer. For example, a seal seat may be a groove machined into the non-electrically-conductive band and thus the band must be deep enough that the machining process does not cut through to the underlying conductive layer.

The height (or radial extent) of the non-electrically-conductive band will be determined according to the size of seal seat that is required for any given application. However, in some examples the non-electrically conductive band extends radially outwardly from the outer surface (or radially inwardly from the inner surface) of the electrically conductive tube by a distance of at least 3 mm, preferably at least 4 mm. In other larger examples the non-electrically-conductive band extends radially outwardly from the outer surface (or radially inwardly from the inner surface) of the electrically conductive tube by a distance of at least 10 mm, preferably at least 15 mm, more preferably at least 20 mm. It will be appreciated that, if required, the non-electrically-conductive band could be recessed into the electrically conductive tube (i.e. some material could be removed from the tube before forming the band on top), but in most cases this will not be necessary or beneficial and therefore for simplicity the band can simply be provided on top of the electrically conductive tube (it will be appreciated that "on top of" can mean "radially outwardly of" or it can mean "radially inwardly of" according to the particular arrangement).

As discussed above, the non-electrically-conductive band creates a small area of non-conductivity on the surface of the tube which can be undesirable from the point of view of static charge build up. However, it has been determined that the non-conductive area can be kept to a sufficiently small area that it poses substantially no risk of charge build up and thus the safety benefits greatly outweigh any potential disadvantages. However, it will therefore be appreciated that the area of non-conductive material is preferably kept to a minimum. Thus the non-electrically-conductive band is preferably of the smallest axial extent necessary to achieve the required electrical separation. The remainder of the tube is electrically conductive for static dissipation. It will be appreciated that the exact proportions and dimensions will depend on the particular circumstances (e.g. size, location, fluid type and fluid flow rate, etc.). However, in some preferred examples the non-electrically-conductive band has an axial extent less than 10 percent of the axial extent of the conductive tube, preferably less than 5 percent, more preferably less than 3 percent. In some preferred examples the non-electrically-conductive band has an axial extent less than 10 cm, preferably less than 5 cm, more preferably less than 3 cm. In some examples the non-electrically-conductive band may have an axial extent of no more than 2.5 cm, no more than 2 cm, no more than 1.5 cm, no more than 1 cm or no more than 5 mm.

According to another aspect of this disclosure, there is provided a fluid transfer conduit comprising: an electrically conductive tube of fibre reinforced polymer composite material which forms the outer surface of the conduit; and on at least one axial end of said conduit, a non-electrically-conductive band formed on the outer surface of the electrically conductive tube.

Depending on the radial thickness of the conduit, it may be sufficient that only the external surface of the conduit be electrically conductive to conduct static away safely. However, in thicker conduits it is also preferred that the inner surface of the conduit is electrically conductive, thus providing for immediate conduction of charge away from the fluid flowing within the conduit. The conduit tube may be formed from multiple layers of fibre-reinforced polymer, each having different properties (e.g. different fibre angles or different materials or different fibre placement methods). So long as there is an electrical conduction path from the inner surface of the tube to an earth point (this may be a local earth point on an aircraft such as a connection to the metal airframe), any intermediate layers between the inner conductive layer and the outer conductive layer may be non-conductive. This may be beneficial for example if conductivity is provided by means of the fibre type such as carbon fibre reinforced polymer and if a layer of another fibre type (such as glass-fibre) would be structurally beneficial. However, in other examples the conductivity is provided by means of a conductive additive such as carbon black added to the resin. In such cases, for simplicity it may be preferred simply to add conductivity to all layers such that the whole thickness of the conduit is conductive from the inner surface through to the outer surface. This may be achieved by adding the conductive additive to the resin for all layers.

As discussed above, it is preferred that the outer surface of the conduit be electrically conductive so as to act as a conductor in the case of a lightning strike (or other current surge). Thus the conduit is preferably also earthed to ensure any such charge is conducted away from the fluid within the conduit. As the non-conductive band electrically isolates the tube from the socket an additional electrical connection is preferably provided. Thus the fluid transfer conduit preferably further comprises an electrical bonding tab close to the axial end of the conduit and electrically connected to the electrically conductive tube. Such a bonding tab may be a simple metal projection in electrical contact with the conductive outer surface of the tube, providing a metallic projection to which a bonding lead can be attached for grounding. The bonding tab may be formed together with the electrically conductive tube by providing it with an anchor surface which is inserted during fibre placement and which is covered by winding or placing fibre over the anchor surface such that the attachment or contact surface projects radially outwardly. For example an L-shaped conductor may have one leg of the L anchored underneath the fibre and the other leg of the L sticking out from the tube as a contact surface.

It will generally be most convenient to have the non-conductive band closer to the axial end of the conduit than the bonding tab. This leaves room for a bonding wire to connect between the bonding tab and another similar tab on the socket. The bonding wire is preferably flexible and has sufficient length that it can accommodate some relative movement of the two bonding tabs.

The non-electrically-conductive band may be formed using any suitable material and technique. However, in certain preferred examples it is formed from a similar material as the rest of the tube, but without the conductivity. This is convenient from a manufacturing perspective. For example, in some preferred examples the conductive tube is formed by a fibre winding technique (which may include various layers of different fibre angles to imbue particular properties). It is thus convenient also to form the non-electrically-conductive band by fibre winding.

As discussed above, the electrically conductive tube may have electrical conductivity be virtue of being formed from a carbon-fibre reinforced polymer. However, carbon-fibres are not suitable for forming the non-conductive band. Therefore in some preferred examples the electrically conductive tube is formed from a glass fibre reinforced resin with an electrically conductive additive added to the resin. This allows the same fibres to be used to form both the electrically conductive tube and the non-conductive band, the only difference being the presence or absence of the conductive additive. The electrically conductive additive is preferably carbon black. Other non-conductive fibres may be used such as nylon fibres, but glass fibre is tough and thus resistant to damage through movement against the socket or other structures and is therefore preferred in some examples. Thus the non-electrically conductive band is preferably formed from the same glass fibre reinforced resin as the electrically conductive tube, but without the electrically conductive additive.

The fluid transfer conduit may be formed from a Polymer Matrix Composite (PMC) which comprises some form of fibre or polymer encased within a matrix such as resin. One example is Carbon Fibre Reinforced Polymer (CFRP). Filament wound structures are typically formed by winding filaments such as carbon fibres around a mandrel in a helical fashion so as to build up a tube shaped shaft. The angle of the helical winding influences the properties of the shaft. For example, windings approaching 45 degrees have higher torsional properties and those higher than 45 degrees have greater properties in the hoop direction. Hoop fibre also has better sealing properties. About 45 degrees is generally optimal for torque transmission. Other techniques for manufacturing PMCs include braiding, fibre placement techniques (including AFP), prepreg wrap techniques and pultrusion methods. The method of forming the filament-based composite is not particularly important.

According to a further aspect, this disclosure provides a fluid connection comprising: a metal connector part; fluid transfer conduit as described above (optionally including any optional or preferred features) wherein an axial end of one of the metal connector part and the fluid transfer conduit is inserted into the axial end of the other of the metal connector part and the fluid transfer conduit; and a sealing member arranged between the non-conductive-band on the fluid transfer conduit and the opposed surface of the metal connector part.

All of the preferred features described above also apply to the fluid connection. In particular, the non-conductive-band preferably has a seal seat formed therein in the form of a circumferential groove, and wherein a sealing member is seated in the groove and is in sealing contact with the groove and with a surface of the metal connector part.

The fluid transfer conduit preferably further comprises an electrical bonding tab close to the axial end of the conduit and electrically connected to the electrically conductive tube, and the metal connector part preferably also comprises an electrical bonding tab attached thereto and the fluid connection thus preferably further comprising an electrically conducting wire electrically connecting the two bonding tabs.

According to a further aspect of this disclosure there is provided a method of making a fluid transfer conduit comprising: forming a tube of fibre reinforced polymer composite material having an electrically conductive outer surface and an electrically conductive inner surface; and on at least one axial end of said conduit, forming a band of non-electrically-conductive material on either the electrically conductive outer surface or the electrically conductive inner surface of the tube.

All of the preferred features described above also apply equally to the method of manufacture. In particular, the electrically conductive tube and the non-electrically conductive band are preferably both formed by filament winding. Preferably the non-electrically-conductive band is formed from hoop wound fibre which may be built up in several successive layers so as to form the necessary height of the band for forming a seal seat therein. The method may comprise using the same fibres for both the electrically conductive tube and the non-electrically-conductive band, with a step of changing the resin to one without a conductive additive before forming the non-electrically-conductive band.

BRIEF DESCRIPTION OF DRAWINGS

One or more non-limiting examples will now be described, by way of example only, and with reference to the accompanying figures in which.

DETAILED DESCRIPTION

Figure 1:
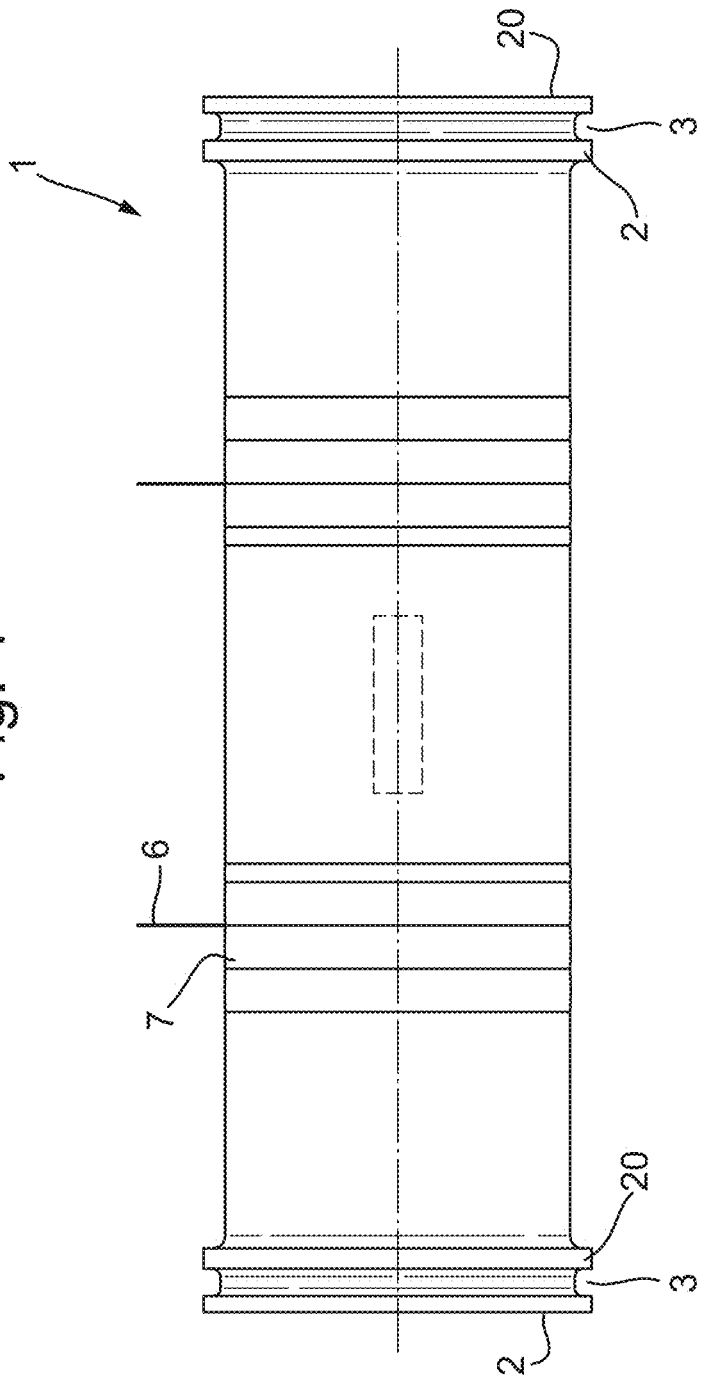
FIG. 1 shows a side view of a fluid transfer conduit.

FIG. 1 shows a fluid transfer conduit 1 in the form of a fuel pipe. The conduit 1 is a cylinder of circular cross-section and is formed from a composite material comprising glass fibres embedded in a resin matrix with a conductive additive such as carbon black. In this example the same resin is used to form the whole of the base cylinder such that the conduit is electrically conductive throughout its thickness, i.e. both the inner surface and the outer surface of the cylinder are conductive. The conductive inner surface serves to prevent static charge build up that might otherwise be created by flow of fuel through the fuel pipe. The conductive outer surface serves to provide a conductive path in the event of a lightning strike, although the conductivity (determined by the quantity of conductive additive) is generally chosen to make it a less preferred path than other components. For example in the case of a fuel pipe for an aircraft wing, other metal structures within the wing will generally form preferred conducting paths for lightning.

At each axial end of the conduit 1 is a seal seat 2 with an O-ring groove 3 formed therein. The seal seat 2 extends radially outwardly from the outer surface of the conduit 1 and the O-ring groove 3 is a circumferential groove extending fully around the conduit 1. The seal seat 2 is formed from a band of non-electrically-conductive material. In particular, in this example, the seal seat 2 is formed from a composite material comprising glass fibres embedded within a non-conductive resin matrix. The resin matrix of the seal seat 2 is the same as the resin matrix of the conduit 1 except that it does not have the electrically-conductive additive added to it. Thus the seal seat 2 forms a non-electrically-conductive band 20 around the conduit 1

Figure 2:
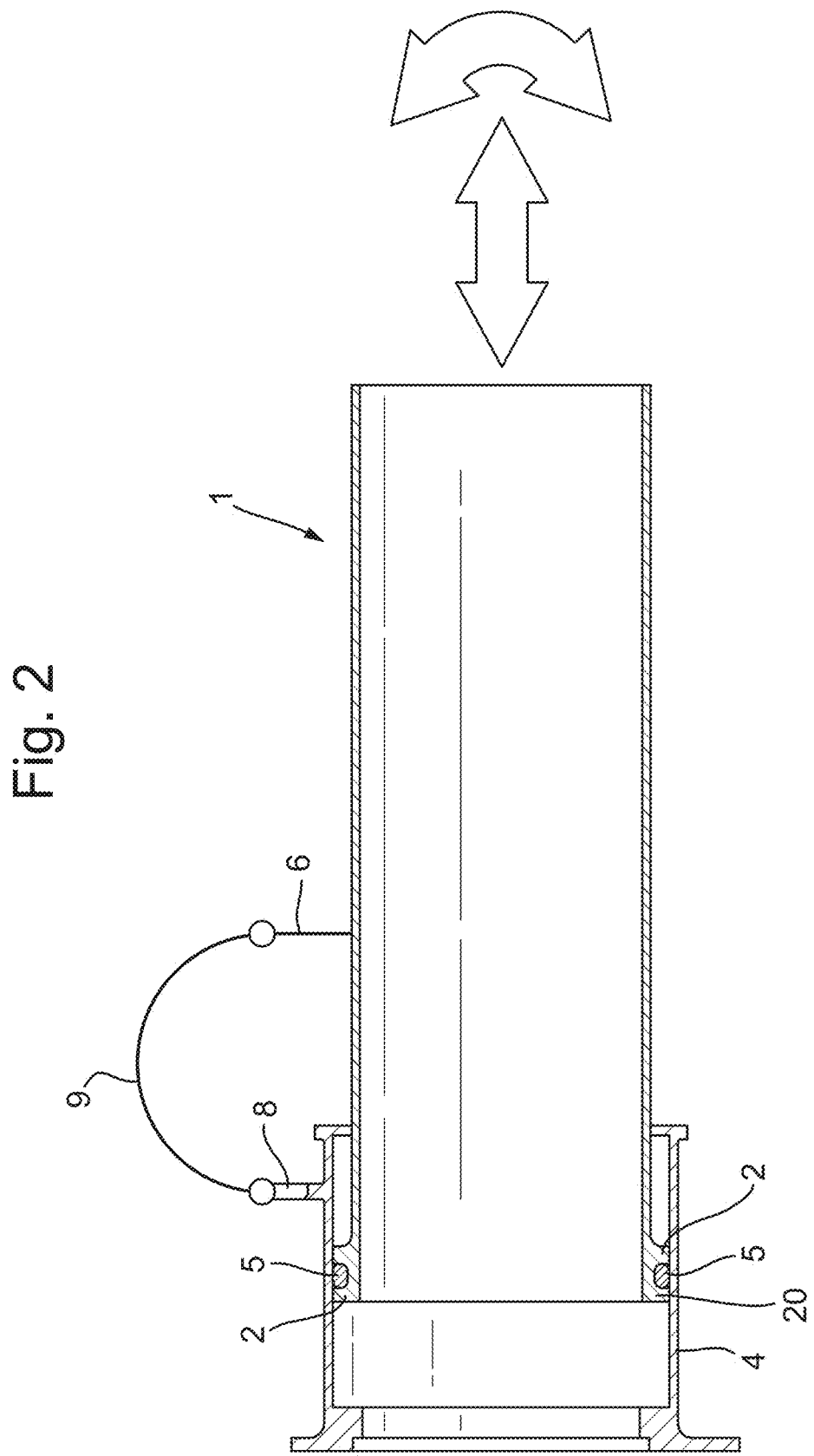
FIG. 2 shows a cross-section of a fluid connection between a fluid transfer conduit and a socket.

In use, the conduit 1 is inserted into a metal socket 4 as shown in FIG. 2 and an O-ring 5 is seated in the groove 3 (i.e. on the outer surface of the conduit 1) for sealing against the inside surface of the socket 4. This arrangement provides a fluid seal between the two parts while allowing some movement (axial movement of the conduit 1 relative to the socket 4 as well as rotational movement of the conduit 1 relative to the socket 4) which is useful in aircraft wing installations where a certain degree of wing flex needs to be accommodated for example.

As the seal seat 2 is non-conductive, if the rubbing of the O-ring 5 against the seat 2 causes any small particles to be dislodged, these will be non-conductive such that if they come into contact with the metal socket 4 there is no risk of galvanic corrosion, even in the presence of an electrolyte.

The non-conductive band 20 that forms the seal seat 2 is of a limited axial extent so that it does not significantly reduce the overall conductivity of the conduit 1. Any regions of the structure which are non-conductive and which may be subjected to fluid contact and flow are at risk of static charge build up and therefore it is desirable to minimise such areas. Thus the axial extent of the non-conductive band is limited to the minimum that is required to prevent galvanic corrosion. In general, the axial extent can be kept below a few centimetres. In this particular example it is no more than 3 cm.

The seal seat 2 is formed by winding fibres around the base cylinder (i.e. the electrically conductive part) of the conduit 1. The seal seat 2 is thus formed from hoop wound fibres and is built up to a large enough height that the groove 3 can be formed therein. The seal seat 2 may be formed as part of the same winding process as the main cylinder, but with a change of resin, or it may be wound as a separate process. The seal seat 2 and the base cylinder may be cured together in the same curing process or the base cylinder may be cured first with the seal seat 2 wound onto the cured base cylinder and then separately cured in a subsequent process.

In this example the seal seat 2 is initially built up as a substantially annular ring of material and the groove 3 is then formed by machining the groove 3 into the ring. It will be appreciated that the groove 3 may in other examples be wound so as to form the required groove shape or the groove shape may be moulded before curing.

In the examples of FIGS. 1 and 2 the seal seat 2 is formed at the extreme axial end of the conduit 1, but it will be appreciated that this need not be the case and it may be formed axially inwardly of the end if desired.

Close to the axial end of the conduit 1, but at a distance therefrom, an electrical bonding tab 6 is attached to the conduit 1 for providing an electrical connection to the conduit 1. The bonding tab 6 may be embedded within the conduit 1 during the winding process so that it is held in place by fibres 7 wound over an anchor part of the tab 6 (not shown). The tab 6 is generally metal and provides a simple connection surface to which a wire may be attached (e.g. clipped or soldered). A similar bonding tab 8 is also provided on the metal socket 4 so that an electrical wire 9 can be used to connect the two parts, thus electrically connecting them together to ensure that they are held at the same potential.

Figure 3:
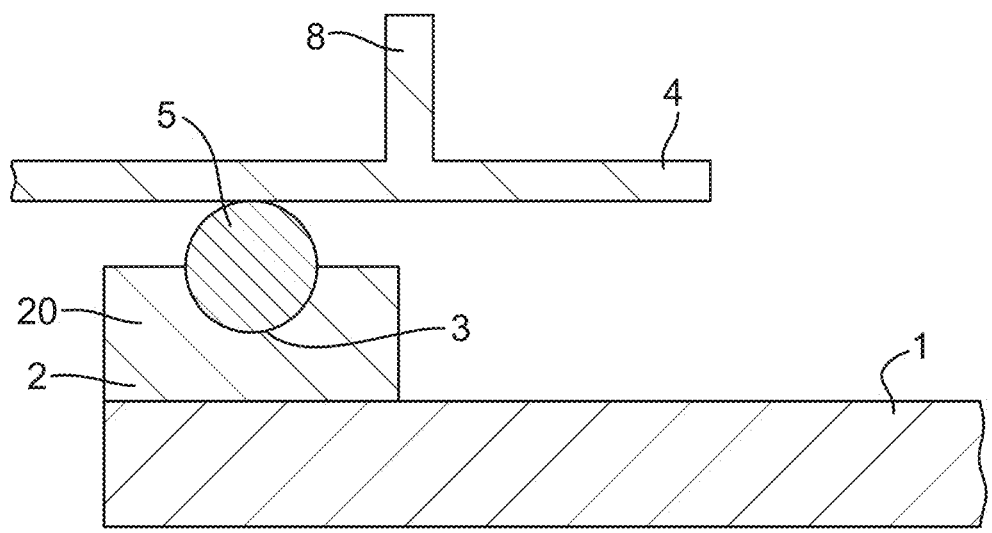
FIG. 3 shows a cross-sectional view of a first example of a joint between a conduit and a metal socket.

FIG. 3 shows an enlarged view of the joint between the conduit 1 and the metal socket 4. The seal seat 2 is formed on the outer surface of the conduit 1 and is formed from a non-electrically conductive material (such as glass-fibre reinforced polymer with no conductive additive) and thus forms the non-electrically-conductive band 20. The seal seat 2 has a groove 3 machined therein. O-ring 5 is seated in the groove 3 and forms a seal between the non-electrically conductive seal seat 2 and the metal socket 4. Any small particles of the seal seat 2 that may be dislodged as a result of friction between the O-ring 5 and the seal seat 2 will not be problematic as they are non-conductive and thus do not risk galvanic corrosion.

Figure 4:
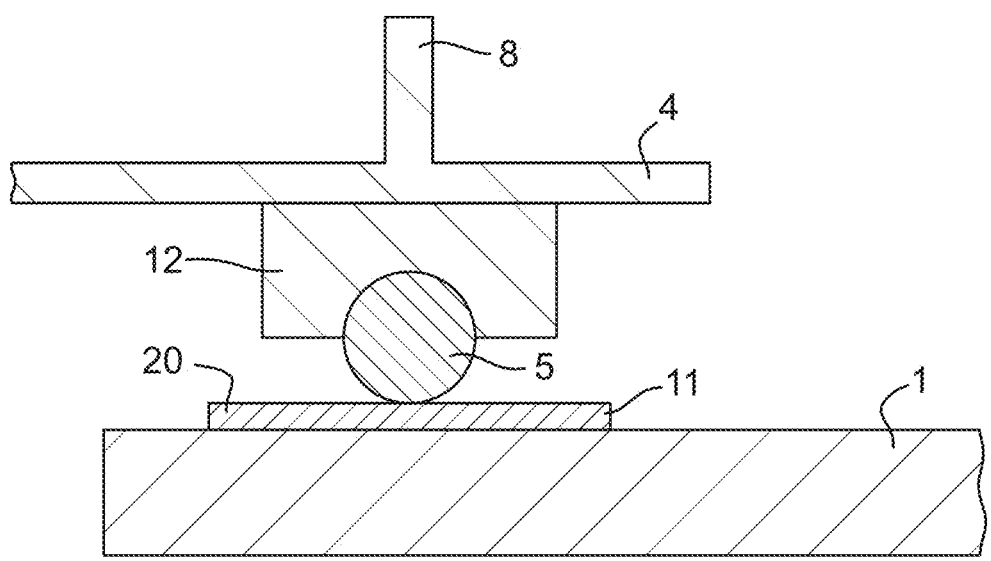
FIG. 4 shows a cross-sectional view of a second example of a joint between a conduit and a metal socket.

FIG. 4 shows a variation of FIG. 3 in which a seal seat 12 is formed on the inner surface of the metal socket 4 instead of on the outer surface of the conduit 1. The O-ring 5 is seated in a groove of the seal seat 12 as in FIG. 3. In this example the material of the seal seat 12 could be either metal or a non-conductive composite material. However, due to the risk of abrasion caused by rubbing of the O-ring 5 against the conduit 1, there is a non-electrically conductive band 20 formed on the outer surface of the conduit 1 and forming a seal land 11 which engages with the O-ring 5. Thus any abrasion will only release non-electrically conductive particles which do not risk galvanic corrosion. In this example the seal land 11 is formed as an additional layer formed on top of the base cylinder of the conduit 1 and therefore sits radially outwardly of the conduit 1.

Figure 5:
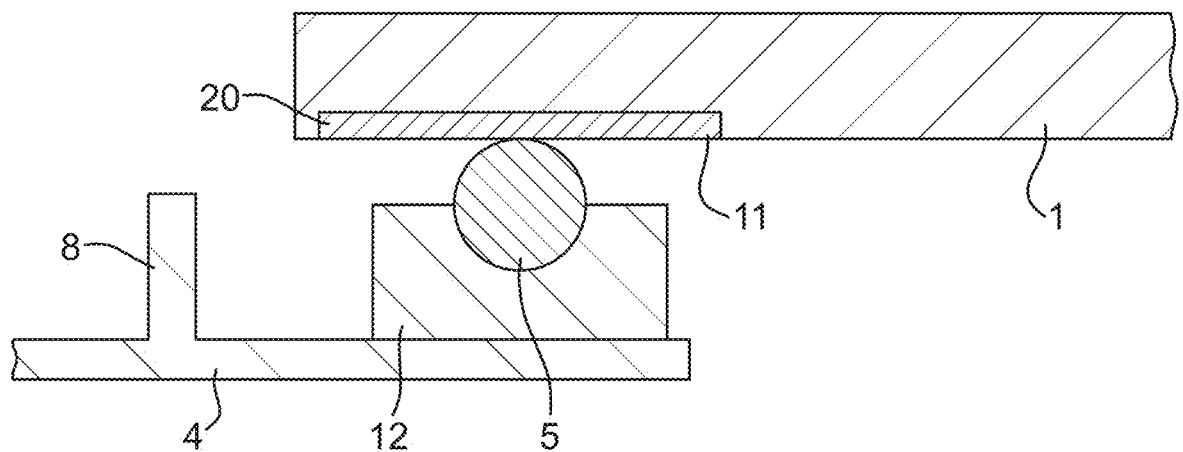
FIG. 5 shows a cross-sectional view of a third example of a joint between a conduit and a metal socket.

FIG. 5 shows another variation in which the socket 4 is of smaller diameter than the conduit 1 (whereas in FIGS. 3 and 4 the socket 4 is of wider diameter). As with FIG. 4 the seal seat 12 is provided on the socket 4 with an O-ring 5 seated therein, but this time the seal seat 12 is formed on the outer surface of the socket 4 rather than on the inner surface thereof. The conduit 1 is likewise provided with a seal land 11 formed as a non-electrically conductive band 20 of fibre-reinforced polymer material, but this time formed on the radially inner surface of the conduit 1 rather than on the radially outer surface thereof. In this example the seal land 11 is also shown inlaid into the conduit 1 rather than sitting proud on the surface thereof. Thus the radially inner surface of the conduit 1 is smooth with the non-electrically conductive seal land 11 being flush with the rest of the inner surface of the conduit 1.

Figure 6:
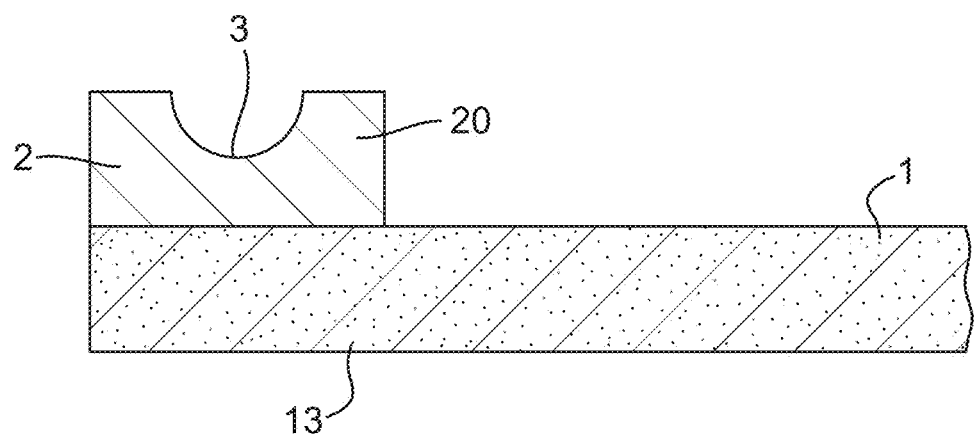
FIG. 6 illustrates the materials in a cross-section through the conduit and seal seat of FIG. 3.

FIG. 6 shows a cross-section through the conduit 1 and seal seat 2 of the example of FIG. 3. The seal seat is formed from fibre-reinforced polymer with no electrically conductive additive added to the resin matrix. The conduit 1 is formed from fibre-reinforced polymer in which an electrically conductive additive such as carbon black 13 has been added to the resin matrix.

The invention claimed is:
1. A fluid transfer conduit comprising:
an electrically conductive tube of fibre reinforced polymer composite material which has an electrically conductive outer surface and an electrically conductive inner surface, wherein the electrically conductive tube is formed from a fibre reinforced polymer composite with an electrically conductive additive added to the fibre reinforced polymer composite; and
    on at least one axial end of said conduit, a non-electrically-conductive band formed on either the outer surface or the inner surface of the electrically conductive tube, wherein the non-electrically conductive band is formed from the same fibre reinforced polymer composite as the electrically conductive tube, but without the electrically conductive additive.

2. A fluid transfer conduit as claimed in claim 1, wherein the non-electrically-conductive band has a seal seat formed therein, preferably in the form of a circumferential groove.

3. A fluid transfer conduit as claimed in claim 1, wherein the non-electrically conductive band extends radially from the surface of the electrically conductive tube by a distance of at least 3 mm, preferably at least 4 mm.

4. A fluid transfer conduit as claimed in claim 1, wherein the non-electrically-conductive band has an axial extent less than 10 percent of the axial extent of the conductive tube.

5. A fluid transfer conduit as claimed in claim 4, wherein the non-electrically-conductive band has an axial extent less than 5 percent of the axial extent of the conductive tube.

6. A fluid transfer conduit as claimed in claim 1, wherein the non-electrically-conductive band has an axial extent less than 3 percent of the axial extent of the conductive tube.

7. A fluid transfer conduit as claimed in claim 1, wherein the non-electrically-conductive band has an axial extent less than 10 cm.

8. A fluid transfer conduit as claimed in claim 7, wherein the non-electrically-conductive band has an axial extent less than 5 cm.

9. A fluid transfer conduit as claimed in claim 8, wherein the non-electrically-conductive band has an axial extent less than 3 cm.

10. A fluid transfer conduit as claimed in claim 1, wherein the non-electrically-conductive band is formed on the outer surface of the tube.

11. A fluid transfer conduit as claimed in claim 1, further comprising an electrical bonding tab close to the axial end of the conduit and electrically connected to the electrically conductive tube.

12. A fluid transfer conduit as claimed in claim 11, wherein the non-electrically-conductive band is closer to the axial end of the conduit than the bonding tab.

13. A fluid transfer conduit as claimed in claim 1, wherein the electrically conductive tube is formed from a glass fibre reinforced resin with an electrically conductive additive added to the resin.

14. A fluid transfer conduit as claimed in claim 13, wherein the non-electrically conductive band is formed from the same glass fibre reinforced resin as the electrically conductive tube, but without the electrically conductive additive.

15. A fluid connection comprising:
    a metal connector part;
    a fluid transfer conduit as claimed in claim 1;
    wherein an axial end of one of the metal connector part and the fluid transfer conduit is inserted into the axial end of the other of the metal connector part and the fluid transfer conduit; and
    a sealing member arranged between the non-electrically-conductive-band on the fluid transfer conduit and the opposed surface of the metal connector part.

16. A fluid connection as claimed in claim 15, wherein the non-electrically-conductive-band has a seal seat formed therein in the form of a circumferential groove, and wherein a sealing member is seated in the groove and is in sealing contact with the groove and with a surface of the metal connector part.

17. A fluid connection as claimed in claim 15, the fluid transfer conduit further comprising an electrical bonding tab close to the axial end of the conduit and electrically connected to the electrically conductive tube, the metal connector part comprising an electrical bonding tab attached thereto and the fluid connection further comprising an electrically conducting wire electrically connecting the two bonding tabs.

18. A method of making a fluid transfer conduit comprising:
    forming a tube of fibre reinforced polymer composite material having an electrically conductive outer surface and an electrically conductive inner surface; and
    on at least one axial end of said conduit, forming a band of non-electrically-conductive material on either the electrically conductive outer surface or the electrically conductive inner surface of the tube by winding fibres around the tube.

19. A method as claimed in claim 18, wherein the electrically conductive tube and the non-electrically conductive band are both formed by filament winding.

20. A method of making a fluid transfer conduit comprising:
    forming a tube of fibre reinforced polymer composite material having an electrically conductive outer surface and an electrically conductive inner surface, wherein the electrically conductive tube is formed from a fibre reinforced polymer composite with an electrically conductive additive added to the fibre reinforced polymer composite; and
    on at least one axial end of said conduit, forming a band of non-electrically-conductive material on either the electrically conductive outer surface or the electrically conductive inner surface of the tube, wherein the non-electrically conductive band is formed from the same fibre reinforced polymer composite as the electrically conductive tube, but without the electrically conductive additive.

* * * * *